US012613925B2

(12) United States Patent
van Rotterdam et al.

(10) Patent No.:  US 12,613,925 B2
(45) **Date of Patent:  \*Apr. 28, 2026**

---

(54) COMPOSITE INDEX ON HIERARCHICAL NODES IN THE HIERARCHICAL DATA MODEL WITHIN CASE MODEL

(71) Applicant: OPEN TEXT CORPORATION, Waterloo (CA)

(72) Inventors: Jeroen M. van Rotterdam, Fort Lauderdale, FL (US); Satyapal P. Reddy, San Ramon, CA (US); Xiaoting Tang, Pleasanton, CA (US); Muneer Ahmed, Dublin, CA (US)

(73) Assignee: Open Text Corporation, Waterloo (CA)

( * ) Notice: Subject to any disclaimer, the term of this patent is extended or adjusted under 35 U.S.C. 154(b) by 115 days.

This patent is subject to a terminal disclaimer.

(21) Appl. No.: 18/363,540

(22) Filed: Aug. 1, 2023

(65) Prior Publication Data

US 2023/0409648 A1     Dec. 21, 2023

Related U.S. Application Data

(63) Continuation of application No. 16/918,723, filed on Jul. 1, 2020, now Pat. No. 11,762,920, which is a
(Continued)

(51) Int. Cl.
*G06F 16/00*       (2019.01)
*G06F 8/20*        (2018.01)
(Continued)

(52) U.S. Cl.
CPC .............. *G06F 16/93* (2019.01); *G06F 8/24* (2013.01); *G06F 16/2228* (2019.01);
(Continued)

(58) Field of Classification Search
CPC .... G06Q 10/06; G06Q 10/067; G06F 21/604; G06F 21/6218; G06F 16/93; G06F 16/83;
(Continued)

(56) References Cited

U.S. PATENT DOCUMENTS 7,653,592 B1    1/2010  Flaxman
8,606,691 B1 *  12/2013  Angermeier ........... G06Q 40/06
                                                        705/36 R (Continued)

FOREIGN PATENT DOCUMENTS

WO      WO2005001627 A2 *  1/2005
WO      WO 2007006613 A2 *  1/2007
WO      WO2007123706 A2 *  11/2007

OTHER PUBLICATIONS

Bounhas, I. et al., "A hierarchical approach for semi-structured document indexing and terminology extraction",2010 International Conference on Information Retrieval & Knowledge Management (CAMP) (2010, pp. 315-320).*
(Continued)

*Primary Examiner* — Srirama Channavajjala
(74) *Attorney, Agent, or Firm* — Sprinkle IP Law Group

(57)            ABSTRACT

Case management systems and techniques are disclosed. In various embodiments, searching case instances is facilitated. An indication to create a composite index across hierarchical case nodes comprising a case model is received. Case instance data associated with the case model is used to generate the composite index. The composite index is made available to be used to optimize searches of a plurality of case instances with which the case instance data is associated.

21 Claims, 18 Drawing Sheets

Related U.S. Application Data continuation of application No. 14/502,322, filed on Sep. 30, 2014, now Pat. No. 10,769,143.

(60) Provisional application No. 62/031,594, filed on Jul. 31, 2014.

(51) Int. Cl.

| | |
|---|---|
| *G06F 16/22* | (2019.01) |
| *G06F 16/2453* | (2019.01) |
| *G06F 16/28* | (2019.01) |
| *G06F 16/83* | (2019.01) |
| *G06F 16/93* | (2019.01) |
| *G06F 40/186* | (2020.01) |
| *G06Q 10/067* | (2023.01) |

(52) U.S. Cl.
CPC ...... *G06F 16/2264* (2019.01); *G06F 16/2453* (2019.01); *G06F 16/282* (2019.01); *G06F 16/83* (2019.01); *G06F 40/186* (2020.01); *G06Q 10/067* (2013.01)

(58) Field of Classification Search
CPC ............... G06F 16/282; G06F 16/2228; G06F 16/2453; G06F 16/2264; G06F 40/186
See application file for complete search history.

(56) References Cited

U.S. PATENT DOCUMENTS

| | | | |
|---|---|---|---|
| 11,893,066 B2 | 2/2024 | Reddy et al. | |
| 11,899,635 B2 | 2/2024 | Reddy et al. | |
| 11,941,068 B2 | 3/2024 | Reddy et al. | |
| 12,164,579 B2 | 12/2024 | Reddy et al. | |
| 12,229,199 B2 | 2/2025 | Reddy et al. | |
| 2001/0007987 A1* | 7/2001 | Igata ........................ | G06F 16/93 |
| 2001/0034701 A1 | 10/2001 | Fox | |
| 2004/0162906 A1* | 8/2004 | Griffin .................... | H04L 63/10 709/229 |
| 2004/0172394 A1* | 9/2004 | Smolsky ................. | G06F 16/93 |
| 2005/0027651 A1 | 2/2005 | DeVault | |
| 2006/0064434 A1* | 3/2006 | Gilbert ................... | G06Q 10/06 |

| | | | |
|---|---|---|---|
| 2006/0074736 A1* | 4/2006 | Shukla ................... | G06Q 10/06 717/100 |
| 2006/0253478 A1 | 11/2006 | Graham | |
| 2007/0050335 A1* | 3/2007 | Kashima ............... | G06F 16/951 |
| 2008/0104022 A1* | 5/2008 | Ronca ..................... | G06F 16/93 |
| 2008/0112006 A1* | 5/2008 | Sambe .................. | G06F 3/1288 358/1.15 |
| 2009/0119334 A1 | 5/2009 | Ahern | |
| 2009/0240550 A1* | 9/2009 | McCarty ............ | G06Q 30/0603 705/7.13 |
| 2011/0047058 A1* | 2/2011 | Erbey .................... | G06Q 40/02 705/35 |
| 2015/0006642 A1 | 1/2015 | Viitala et al. | |
| 2015/0347472 A1* | 12/2015 | Gupta .................. | G06F 16/282 707/805 |
| 2024/0020344 A1 | 1/2024 | Reddy et al. | |
| 2024/0111741 A1 | 4/2024 | Reddy et al. | |
| 2024/0176825 A1 | 5/2024 | Reddy et al. | |

OTHER PUBLICATIONS

Notice of Allowance issued for U.S. Appl. No. 17/950,182, mailed Sep. 7, 2023, 8 pages.

Notice of Allowance issued for U.S. Appl. No. 16/714,241, mailed Sep. 12, 2023, 9 pages.

Notice of Allowance issued for U.S. Appl. No. 17/404,035, mailed Sep. 27, 2023, 8 pages.

Office Action issued for U.S. Appl. No. 18/478,423, mailed May 28, 2024, 8 pages.

Office Action issued for U.S. Appl. No. 18/538,120, mailed Jul. 3, 2024, 26 pages.

Office Action issued for U.S. Appl. No. 18/436,114, mailed Sep. 11, 2024, 7 pages.

Notice of Allowance issued for U.S. Appl. No. 18/478,423, mailed Sep. 13, 2024, 8 pages.

Office Action issued for U.S. Appl. No. 18/538,120, mailed Jan. 7, 2025, 26 pages.

Office Action issued for U.S. Appl. No. 18/538,120, mailed Apr. 23, 2025, 22 pages.

Office Action issued for U.S. Appl. No. 18/538,120, mailed Oct. 20, 2025, 22 pages.

Office Action issued for U.S. Appl. No. 18/538,120, mailed Jan. 28, 2026, 15 pages.

* cited by examiner

To Network

206

Start

Receive and store definition of hierarchical data model — 602

Receive and store definition of case roles — 604

For each case node, receive and store definition of metadata, behaviors, associated content (e.g., documents), states, and permissions — 606

End

1500

| F11.attribute_A | F112.attribute_B |
|---|---|
|  |  |
|  |  |
|  |  |
|  |  |
|  |  |
|  |  |
|  |  |
|  |  |
| ⋮ | ⋮ |
|  |  |
|  |  |

| Checklist.name | Checklist-item.phase |
|---|---|
|  |  |
|  |  |
|  |  |
|  |  |
|  |  |
|  |  |
|  |  |

Start

Receive query including search criteria across case nodes ⟋ 1802

Use composite index, if available, to optimize query ⟋ 1804

Execute optimized query and return results ⟋ 1806

End

COMPOSITE INDEX ON HIERARCHICAL NODES IN THE HIERARCHICAL DATA MODEL WITHIN CASE MODEL

CROSS-REFERENCE TO RELATED APPLICATION(S)

This application is a continuation of, and claims a benefit of priority under 35 U.S.C. 120 from, U.S. patent application Ser. No. 16/918,723, issued as U.S. Pat. No. 11,762,920, filed Jul. 1, 2020, entitled "COMPOSITE INDEX ON HIERARCHICAL NODES IN THE HIERARCHICAL DATA MODEL WITHIN CASE MODEL," which claims a benefit of priority under 35 U.S.C. § 120 from, U.S. patent application Ser. No. 14/502,322, filed Sep. 30, 2014, issued as U.S. Pat. No. 10,769,143, entitled "COMPOSITE INDEX ON HIERARCHICAL NODES IN THE HIERARCHICAL DATA MODEL WITHIN CASE MODEL," which claims a benefit of priority under 35 U.S.C. § 119 (e) from U.S. Provisional Application No. 62/031,594, filed Jul. 31, 2014, entitled "BINDING TRAITS AND EXTERNAL OBJECTS TO CASE MODEL NODES AND COMPOSITE INDEX FOR SAME." All applications listed in this paragraph are fully incorporated by reference herein for all purposes.

BACKGROUND OF THE TECHNOLOGY

Case management systems, software, and/or cloud-based or other electronically-provided case management services (collectively, "Case Management Systems") are used to automate the management of complex sets of documents or other content and associated business or other processes, particularly in situations in which the documents or other content that may need to be managed for respective particular instances of a case model/type (e.g., a loan application) may not be the same for each instance and the processing required and/or selected to be performed may not be the same for each instance.

A case model ("Case Model") typically describes a type of case, instances of which are to be managed by a Case Management System. As opposed to very structured business process that defines a predetermined work flow that does not vary from instance to instance, using a Case Model one can model ad hoc actions and define responses thereto with mini workflows, enabling the processing of respective instances of a Case Model to be determined dynamically at runtime based, e.g., on events, context data, user input, dynamic evaluation of documents or other content, etc. As a result, each instance of a Case Model (e.g., the respective loan applications of different applicants) may follow its own course as determined at each step by processing as defined in applicable portions of the Case Model.

BRIEF DESCRIPTION OF THE DRAWINGS

Various embodiments of the technology are disclosed in the following detailed description and the accompanying drawings.

FIG. 15 is a block diagram illustrating an example of a composite index in an embodiment of a case management system.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

Composite indexes across nodes of a hierarchical/nested container (date) model of a case model are disclosed. In various embodiments, one or more composite indexes may be defined and made available, e.g., to facilitate efficient queries across case model instances. In some embodiments, when defining a case model for a specific problem domain, a developer or other user can define possible combinations of indexes spanning the hierarchy, based on which there could be queries, and these combinations may be used to generate appropriate composite indexes. In some embodiments, automated processing, such as static analysis of the case model definition and/or programmatically observed query-response latency times may be used to determine the need for and/or to generate composite indexes.

In various embodiments, determining at case model design time, for example, that a composite index to be used to execute an anticipated query may enable application/domain specific optimizations for queries spanning multiple nodes in the hierarchy to be modeled and translated into specific composite indexes.

Figure 1:
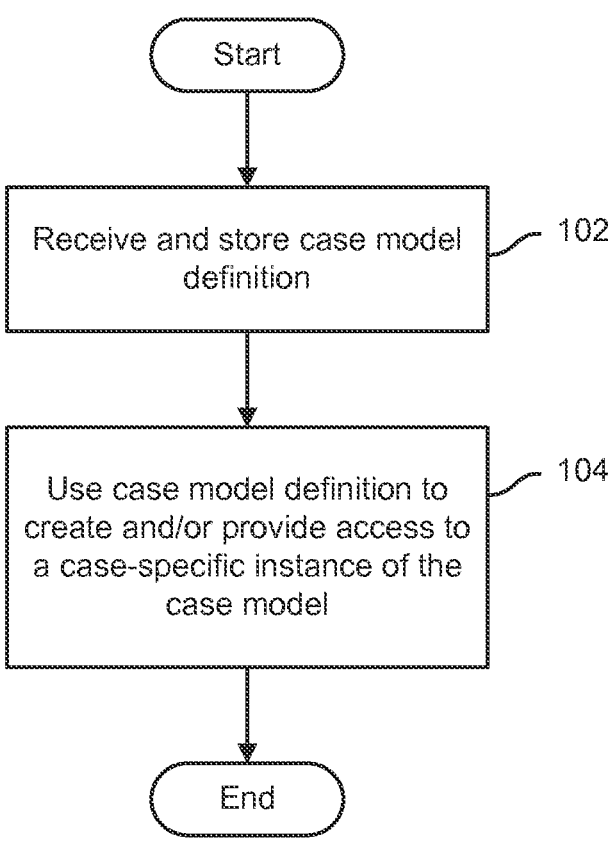
FIG. 1 is a flow chart illustrating an embodiment of a process to perform case management.

FIG. 1 is a flow chart illustrating an example embodiment of a process to perform case management. In the example shown, a case model definition is received and stored (102). The case model definition is used to create new instances based on the case model, sometimes referred to herein as "case instances" or "case management instances", and/or to provide access to previously-created instances (104). For example, a case model may be defined and stored for a loan application and associated processes. Case instances may be created based on the case model and each respective case instance used to manage a corresponding loan application, for example by different respective loan applicants.

A case model typically describes a case management system. Using a case model, one can model ad hoc actions with mini workflows, for example, as opposed to very structured process that defines an end-to-end business work-flow. In various embodiments, a case model comprises a hierarchical/nested container model (sometimes referred to herein as a "hierarchical data model"), and may in addition define case roles, case phases (states), and/or permissions. In some embodiments, permissions may be defined for each case node and/or level in the hierarchy, and may vary in some embodiments based at least in part on the respective phases (states) of a state machine defined for a case node.

In various embodiments, a case model may include a hierarchical/nested container model. This model represents how the data within a case is organized and what data is captured during runtime. Each node in the hierarchy is sometimes referred to herein as a "case node". Case nodes at the lowest level of a case model hierarchy may be referred to as "case leaf nodes" or simply "leaf nodes". "Case leaf nodes" in various embodiments may point to a specific business object or document type.

The term "case role" is used herein to refer to user roles that have been defined in a case model. In various embodiments, users may be assigned to case roles with respect to instances of a case model, and at each case node in the case model permissions may be designated by reference to one or more case roles. During runtime in some embodiments members may be added or removed from these roles at case node instances corresponding to respective instances of a type of case as defined in a case model.

In various embodiments, at each case node a metadata model that defines one or more traits and/or associated behavior may be defined.

In various embodiments, a case model as described herein may be created using a domain-specific or other development module or tool. For example, reusable elements, such sample case nodes typical of those used in the domain (e.g., documents, case roles, behaviors, etc. Typically associated with a loan application process, a new drug approval application, etc.), primitives usable to define a state machine and/or associated processing for respective case nodes, etc., may be provided. For example, an application programming interface (API) may be defined, and/or a visual or other case model development tool may be provided.

In various embodiments, a case model definition is embodied in an eXtensible Markup Language (XML) or other structured data file. A case management system and/or platform is provided, which is configured (e.g., by software) to load a case model definition, parse the definition, and create an instance of the case model based on the definition. Instance-specific attributes and/or state information or other metadata may be stored in a case model instance data store, e.g., a database. At runtime, the case model definition file and the case model instance data for a given instance are used by the disclosed case management system to implement the case model instance, including by performing processing and managing case model instance associated content per the case model definition, in light of the current values of the case model instance data for that instance.

Figure 2:
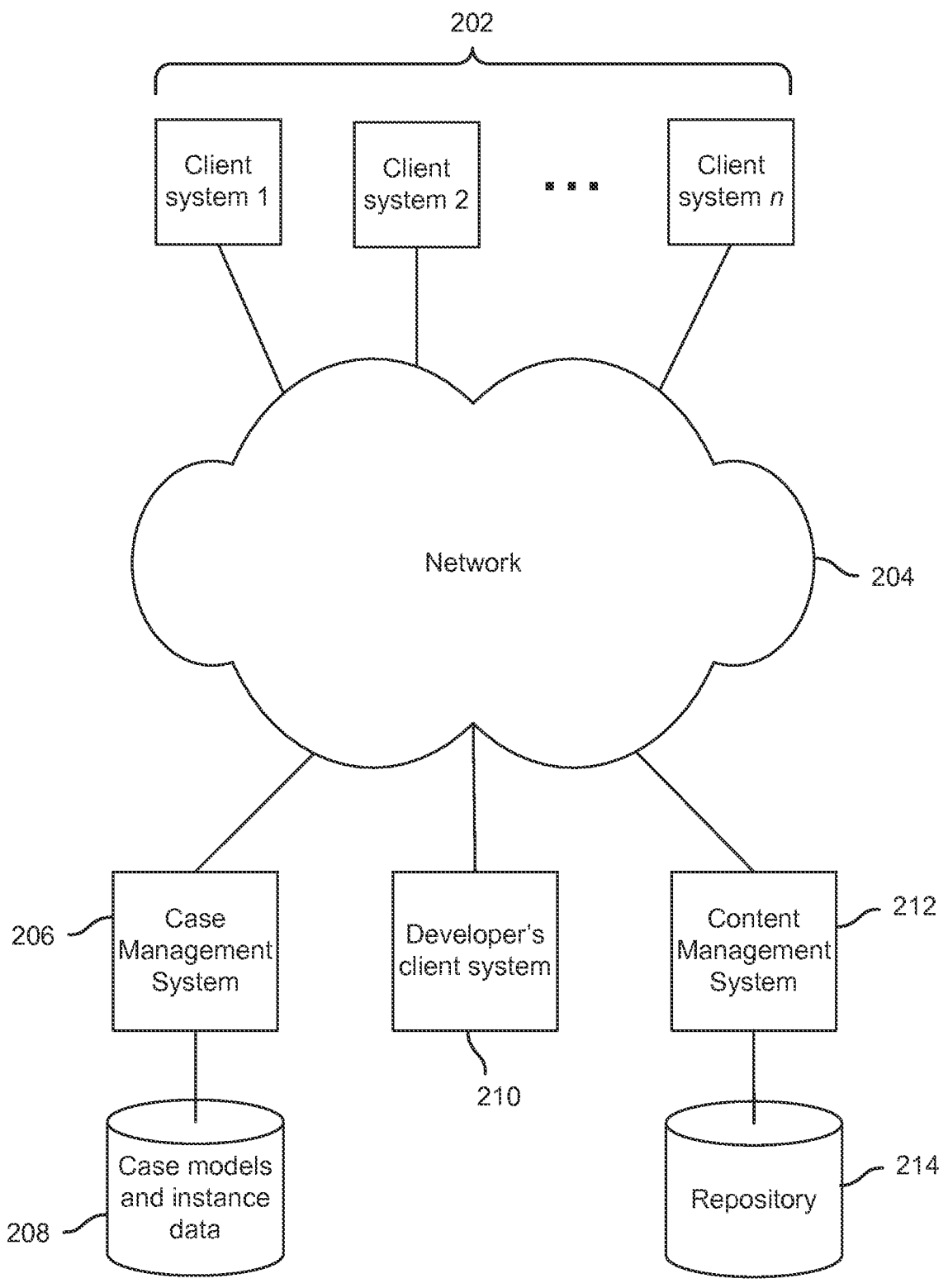
FIG. 2 is a block diagram illustrating an example embodiment of a case management system and environment.

FIG. 2 is a block diagram illustrating an example embodiment of a case management system and environment. In the example shown, client systems 202 are connected via a network 204, e.g., the Internet, to a case management system 206. In various embodiments, the case management system 206 may be configured to implement the process of FIG. 1. Case management system 206 uses case models stored in data storage 208 to provide case management services with respect to case management instances, the instance variable data values of which also are stored, in this example, in data storage 208. For example, one or more of clients 202 may connect via network 204 to case management system 206 to obtain access to case management services. For example, case management system 206 may expose a "case management system as a service", e.g., as a web service, enable clients 202 to connect to case management system 206, create case management instances based on case models stored in data storage 208. The users of client system 202 may be prompted to provide data values and/or other user input to populate case management instances with metadata, user data, documents, etc., and/or such other user input as may be required to advance case instances through case management processing as defined in the case model.

In the example shown in FIG. 2, a case model developer system 210, e.g., a client computer system, also can connect to case management system 206 via network 204. In some embodiments, a case model development user interface and/or service may be accessed and used to define a case model. For example, a visual or other developer tool may be presented to enable a developer using client system 210 to define a case model and cause the case model to be stored in data storage 208 and deployed by case management system 206. In some embodiments, deployment of a case model includes making the case model available to be used to create case management instances based on the model, and to use the case model to perform with respect to each such instance the case management processing as defined in the case model.

In various embodiments, a case model may indicate one or more content objects to be associated with respective instances of a case model. The case model may include metadata and associated behaviors to enable instance-specific content objects (e.g., documents) to be associated with case leaf nodes of a case instance. In the example shown in FIG. 2, content objects may be accessed via a content management system 212 configured to manage content objects stored in an associated content repository 214. In various embodiments, case management system 206 may be configured to use instance variables associated with a given case instance and metadata and/or behaviors defined in an associated case model to interact programmatically with content management system 212 to obtain and/or manage documents or other content objects associated with a case instance. In some embodiments, case management system 206 may be configured, e.g., via the case model, to invoke services and/or other functionality of content management system 212 with respect to such documents or other content objects.

Figure 3:
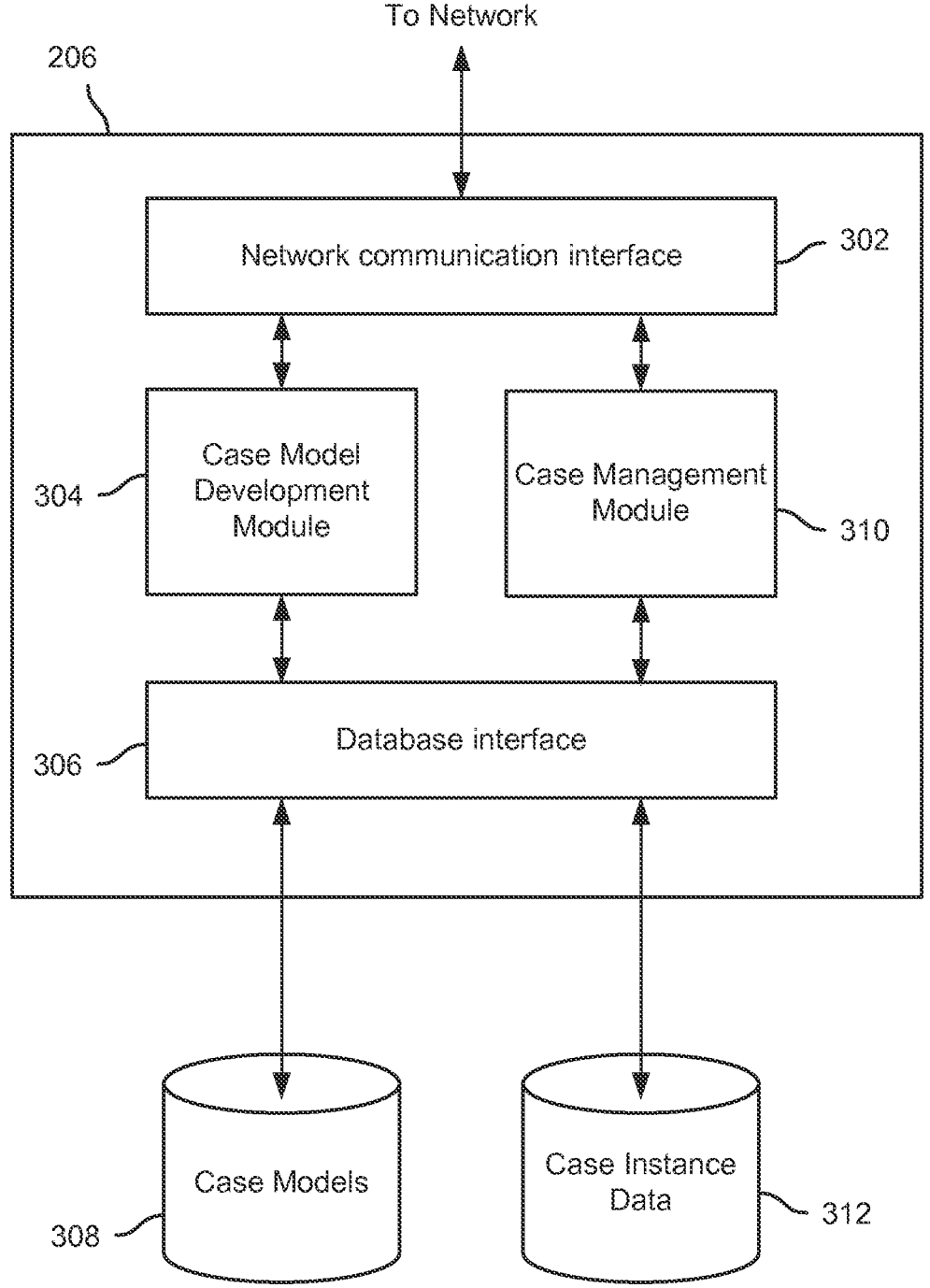
FIG. 3 is a block diagram illustrating an example embodiment of a case management system.

FIG. 3 is a block diagram illustrating an example embodiment of a case management system. In some embodiments, the case management system of FIG. 3 corresponds to case management system 206 of FIG. 2. In the example shown, case management system 206 includes a network communication interface 302, such as a wireless or other network interface card, to provide network connectivity, e.g., to network 204 of FIG. 2. A case model development module 304 is accessible to developers via network communication interface 302 and may be used to create and/or modify case model definitions. In some embodiments, a visual or other user interface is provided, via network communication interface 302, to enable case models to be created and/or modified. For example, a developer may use a browser to access the developer user interface in some embodiments. Case model definitions are stored by case model development module 304 by using a backend database (or other data storage) interface 306 to store the case model(s) in case model store 308.

Referring further to FIG. 3, the case management system 206 includes a case management module 310. In various embodiments, case management module 310 includes functionality to enable users, e.g., users of client systems 202 of FIG. 2, to create and/or use case management instances based on case models stored in case model store 308. Case management module 310, for example, may expose a web or other interface to remote users and may receive via said interface a request to create and/or access a case instance. Case management module 310 uses database interface 306 to obtain an associated case model definition from case model store 308, to use the case model to instantiate case instances. Instance variables are stored by case management module 310 in case instance data store 312.

Figure 4:
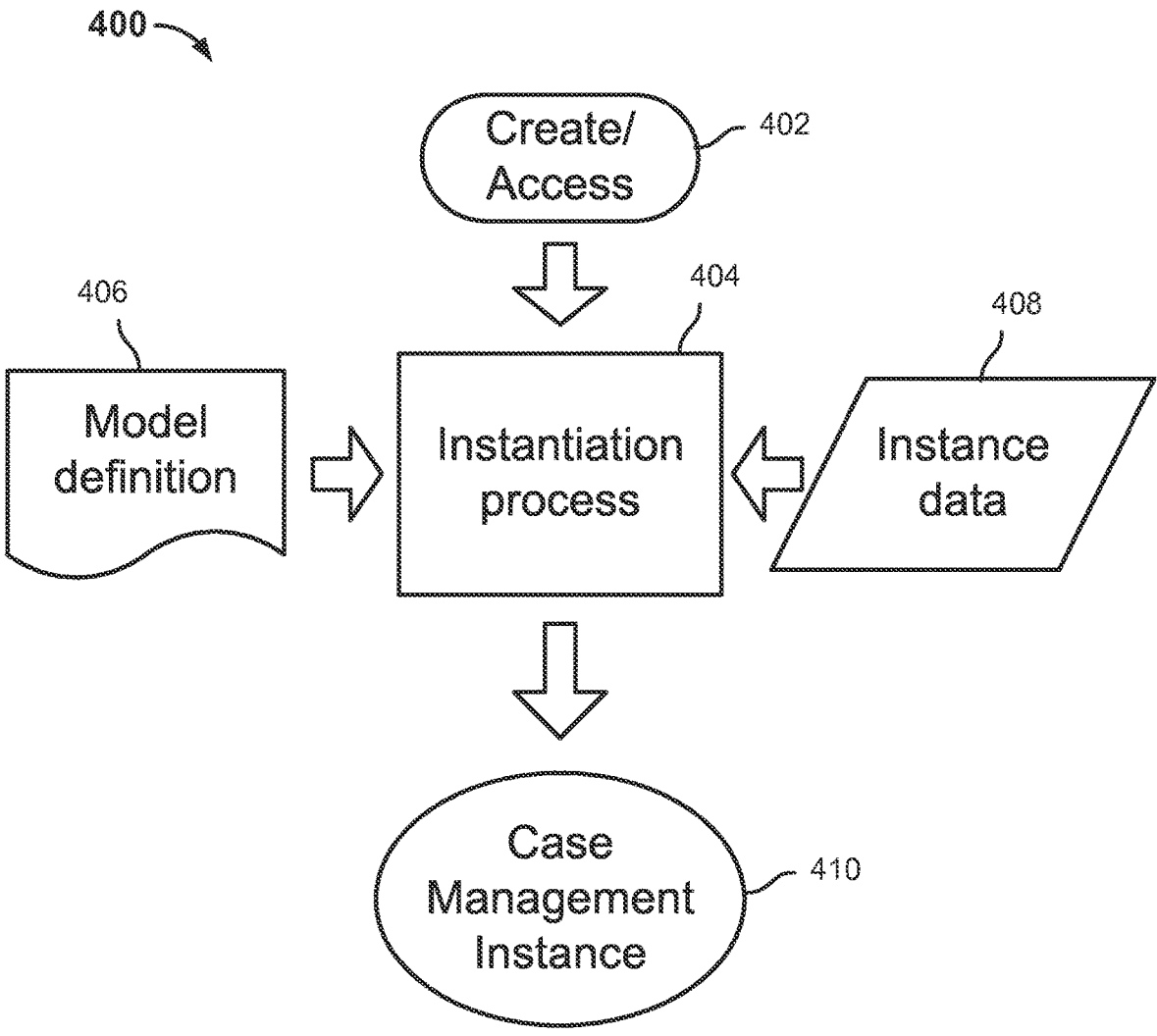
FIG. 4 is a diagram illustrating an example embodiment of a process and system to create and/or provide access to case management instances.

FIG. 4 is a diagram illustrating an example embodiment of a process and system to create and/or provide access to case management instances. In some embodiments, the process of FIG. 4 may be implemented by a case management system and/or a component thereof, such as case management module 310 of FIG. 3. In the example shown, case management system 400 receives a request 402 to create or access a case management instance and invokes instantiation process 404. Instantiation process 404 uses a case model definition 406 associated with the request, e.g., a case model indicated explicitly and/or otherwise associated with data comprising the request 402, and case management instance data 408 associated with the case management instance, to instantiate and provide access to a case management instance 410.

In various embodiments, a case model definition such as model definition 406 may include an XML file or other structured data, which the case management system is configured to parse and use to construct case instances based on the case model. For example, the hierarchical data structure may be defined, along with metadata and associated behaviors for each case node. A case management instance, such as case management instance 410, may include an in memory instance of a data structure defined in case model definition 406, which is used to store instance variables, such as instance data 408 in this example.

Figure 5:
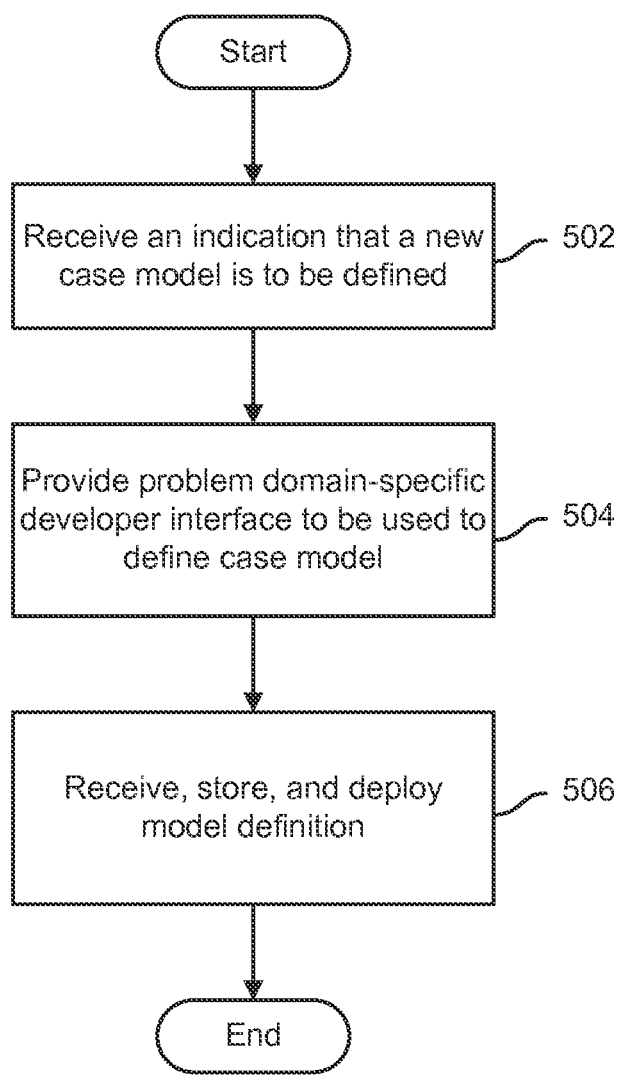
FIG. 5 is a flow chart illustrating an example embodiment of a process to receive and store a case model.

FIG. 5 is a flow chart illustrating an example embodiment of a process to receive and store a case model. In some embodiments, the process of FIG. 5 is used to implement step 102 of FIG. 1 and is performed by a case management system, such as case management system 206 of FIGS. 2, e.g., case model development module 304 of FIG. 3. In the example shown, an indication that a new case model is to be defined is received (502). A problem domain-specific developer interface to be used to define the case model is provided (504). For example, in some embodiments a developer may indicate in a request to define a new case model, and/or may be prompted to indicate, a "problem domain" with which the case model is associated, such as a loan application, an employment application, a product development or other business project, a healthcare or other patient, a claim for reimbursement or benefits, or a matter being handled by a professional or personal service provider, such as a lawsuit, home renovation project, etc. In various embodiments, the problem domain-specific developer interface provides access to problem domain-specific elements to assist the developer in defining the case model. For example, a loan application typically is initiated by a loan applicant submitting an application, and typically involves gathering information to verify and evaluate the applicant's identity, financial assets, income, creditworthiness, etc. In some embodiments, a template may be provided to be used as a starting point. The developer uses visual or other tools to customize the template as desired to define a case model.

Once the developer has completed and submitted the case model definition, the case model definition is received, stored, and deployed (506). In some embodiments, a runtime representation of the definition is processed, e.g., upon submission by the developer, to generate an XML or other structured data file that embodies the case model as defined. Deployment in various embodiments includes making the case model definition available to be used to instantiate case management instances based on the case model, e.g., individual loan application cases.

Figure 6:
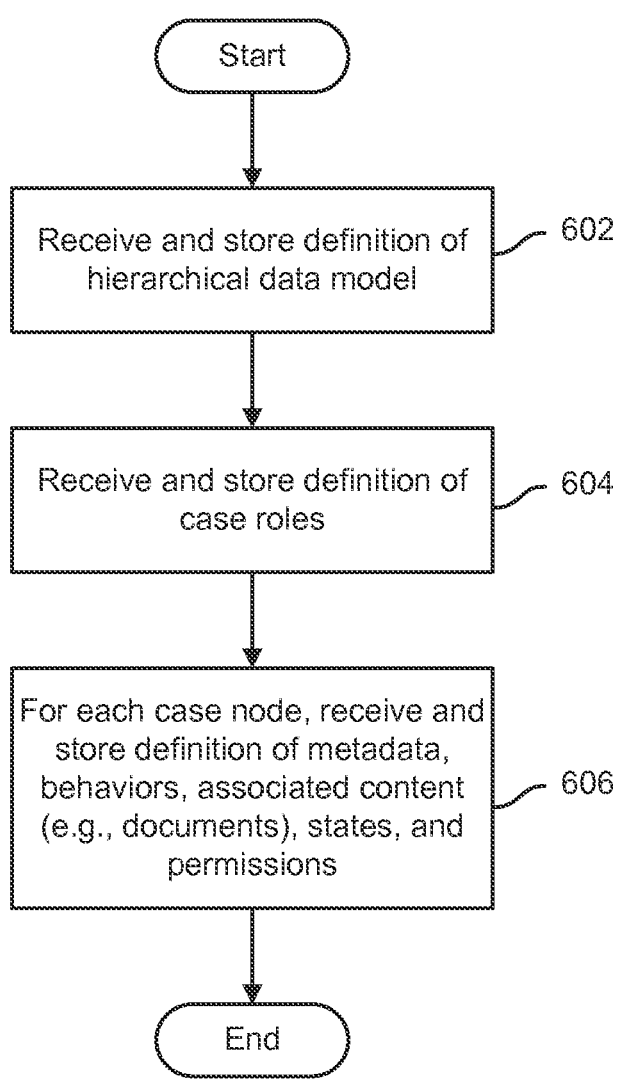
FIG. 6 is a flow chart illustrating an example embodiment of a process to receive and store a case model.

FIG. 6 is a flow chart illustrating an example embodiment of a process to receive and store a case model. In some embodiments, the process of FIG. 6 is included in step 506 of FIG. 5. In the example shown, a definition of a hierarchical/nested data model is received (602). For example, a user interface that enables a developer to drag and drop case nodes onto a canvass and to indicate hierarchical relationships between case nodes may be provided and used by the developer to define a hierarchical/nested data model. A definition of case roles is received and stored (604). For example, a "loan application" case model may include user roles such as "loan initiator", "underwriter", "appraiser", etc. For each case node in the hierarchical/nested data model, a definition of metadata, behaviors, content (e.g., documents), states/phases (and transitions between states/ phases), and/or permissions (e.g., by case role) is received (606). For example, in various embodiments a developer interface may be provided to enable a developer to select a case node and be presented with an interface to define a state machine for that case node.

Figure 7:
FIG. 7 is a block diagram illustrating an example of a hierarchical data model in an embodiment of a case management system.
Figure 7:
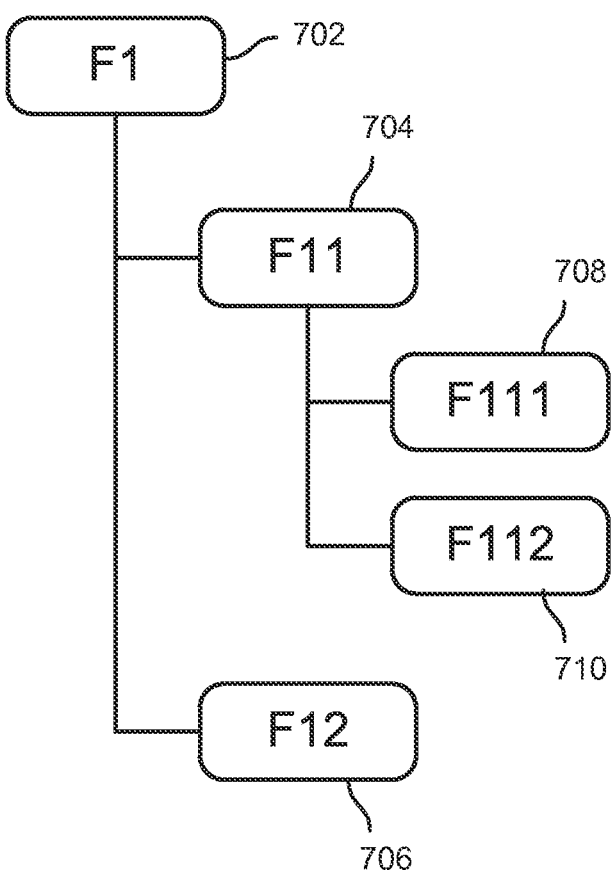

FIG. 7 is a block diagram illustrating an example of a hierarchical data model in an embodiment of a case management system. In various embodiments, a case model, such as one defined using the processes of FIGS. 5 and 6, may include a hierarchical/nested container model, such as the one shown in FIG. 7. In the example shown, hierarchical/nested container model 700 includes a root node 702 at a first (highest) hierarchical level. At a first hierarchical level below the root node, nodes 704 and 706 are included. Finally, in a lowest hierarchical level (in this example), node 704 has two "case leaf nodes" 708 and 710. In various embodiments, metadata, behaviors, permissions, etc. that have been defined for a case node extend (or in some embodiments may at the option of the case model developer be extended) to child case nodes of the case node at which such metadata, behaviors, permissions, etc. have been defined.

Figure 8:
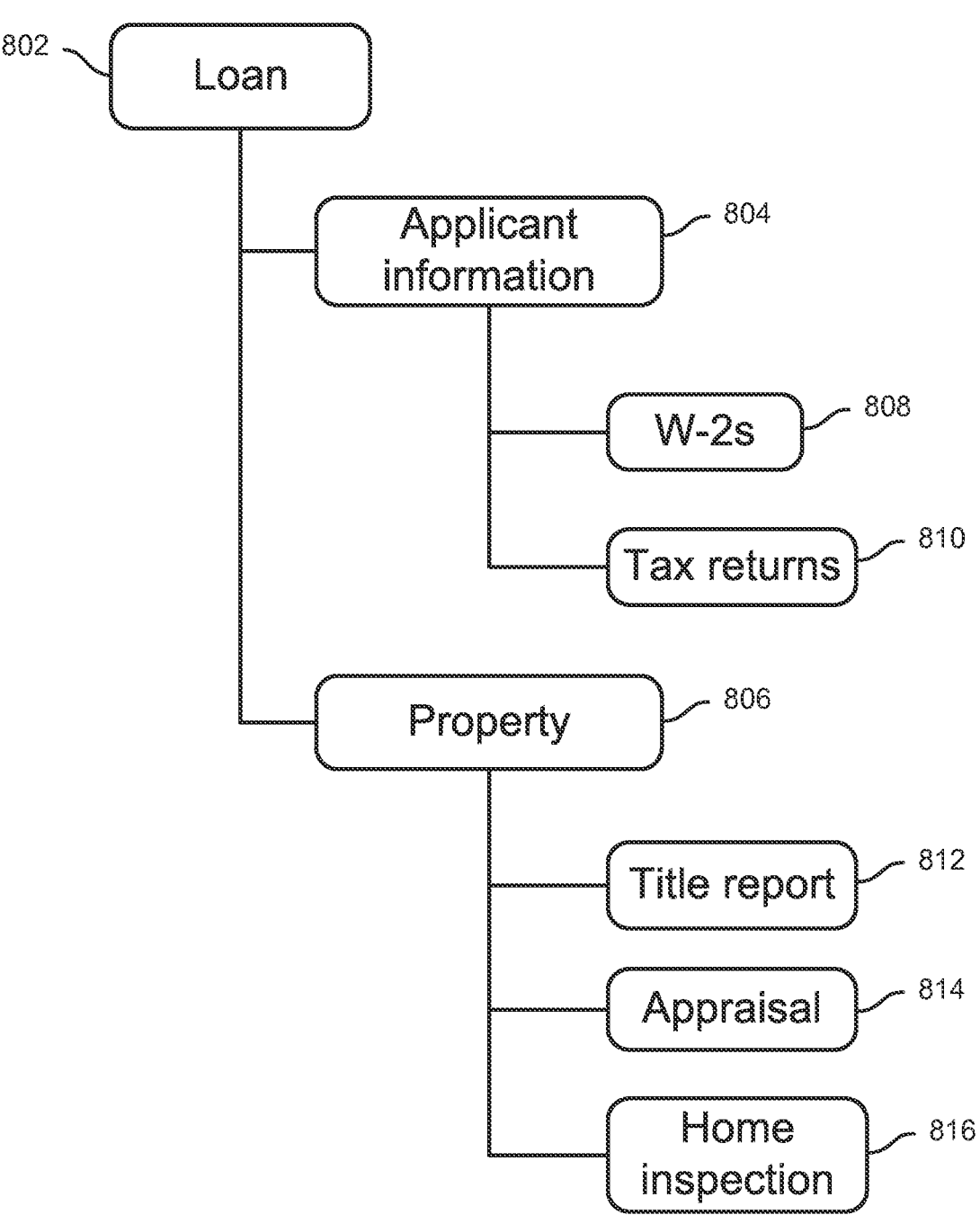
FIG. 8 is a block diagram illustrating an example of a hierarchical data model in an embodiment of a case management system

FIG. 8 is a block diagram illustrating an example of a hierarchical data model in an embodiment of a case management system, such as case management system 206 of FIG. 2. In particular, a hierarchical/nested container model for a home loan application is illustrated. In the example shown, each instance of a "loan" case includes a root node 802 and two first level sub-nodes 804 and 806, in this example one (804) for financial information of the applicant and associated processing, and another (806) for information and processing associated with the home to be purchased using the loan. The "applicant information" sub-node 804 includes a first case leaf node 808 for Forms W-2 and a second case leaf node 810 for the applicant's tax returns. "Property" sub-node 806 includes case leaf nodes 812, 814, and 816 for the title report, appraisal report, and home inspection report, respectively. In various embodiments, the case model definition may include for each case node a definition of metadata and/or behaviors for that case node. For case leaf nodes, such as case leaf nodes 808, 810, 812, 814, and 816, the case model definition may include information regarding documents or other content objects to be associated with such nodes, including in some embodiments an identification of a storage location in which such documents are to be stored, e.g., in a content repository such as repository 214 of FIG. 2 associated with a content management system such as content management system 212 of FIG. 2.

Figure 9:
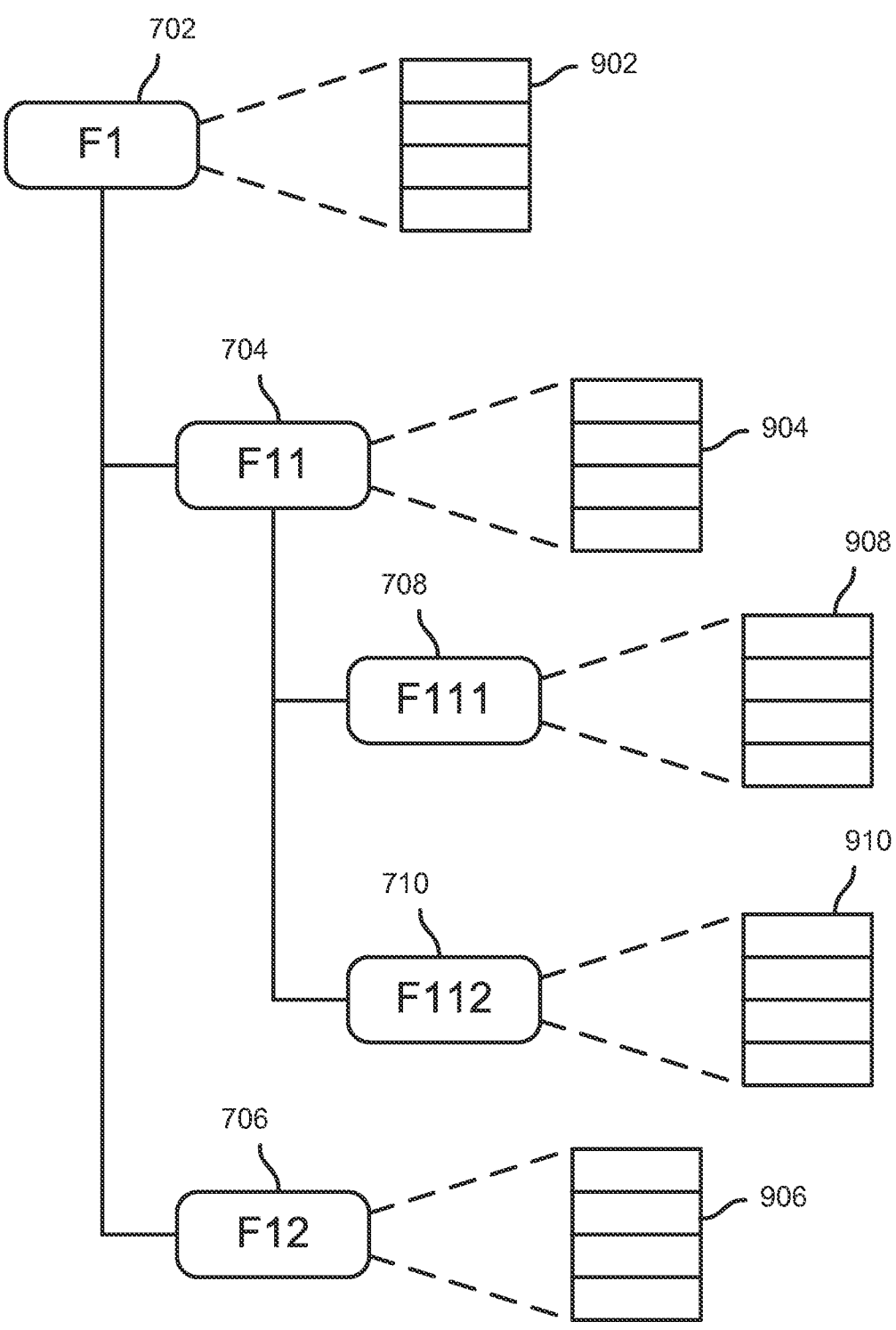
FIG. 9 is a block diagram illustrating an example of a case model and associated trait definitions in an embodiment of a case management system.

FIG. 9 is a block diagram illustrating an example of a case model and associated trait definitions in an embodiment of a case management system. In the example shown, each case node (702, 704, 708, 710, and 706) of the case model shown in FIG. 7 is shown in FIG. 9 to have associated therewith a corresponding trait definition, i.e., 902, 904, 908, 910, and 906, respectively. In various embodiments, at each case node, the corresponding trait definition may include a definition of a set of one or more metadata values or other attributes associated with that case node and/or behaviors associated with such metadata values and/or other behaviors associated with that case node. In various embodiments, a case model definition may include a definition of a hierarchical/nested container model, such as case model 700 of FIG. 7, and for each case node in the hierarchical/nested container model the case model definition may include a corresponding trait definition, such as trait definitions 902, 904, 908, 910, and 906 of FIG. 9. In various embodiments, the trait definitions may be used by a case management system, such as case management system 206 of FIGS. 2 and 3, to create and use case management instances that implement the trait definition. For example, metadata attributes associated with a case node by a trait definition may be used to create for a case instance a corresponding data structure to store case instance-specific values for such metadata attributes.

Similarly, behaviors included in the trait definition may be implemented. For example, a behavior to send a notification when a metadata attribute is updated with a new value for a case instance may be implemented by generating and sending the notification as defined in the trait definition. In some embodiments, a behavior as defined in a trait definition may be associated with metadata attributes and/or may use or otherwise depend on case instance variables, such as users assigned to case roles with respect to a case instance, etc. For example, a trait definition may specify that a notification should be sent to a user(s) assigned to a specified case role with respect to the case instance.

Figure 10:
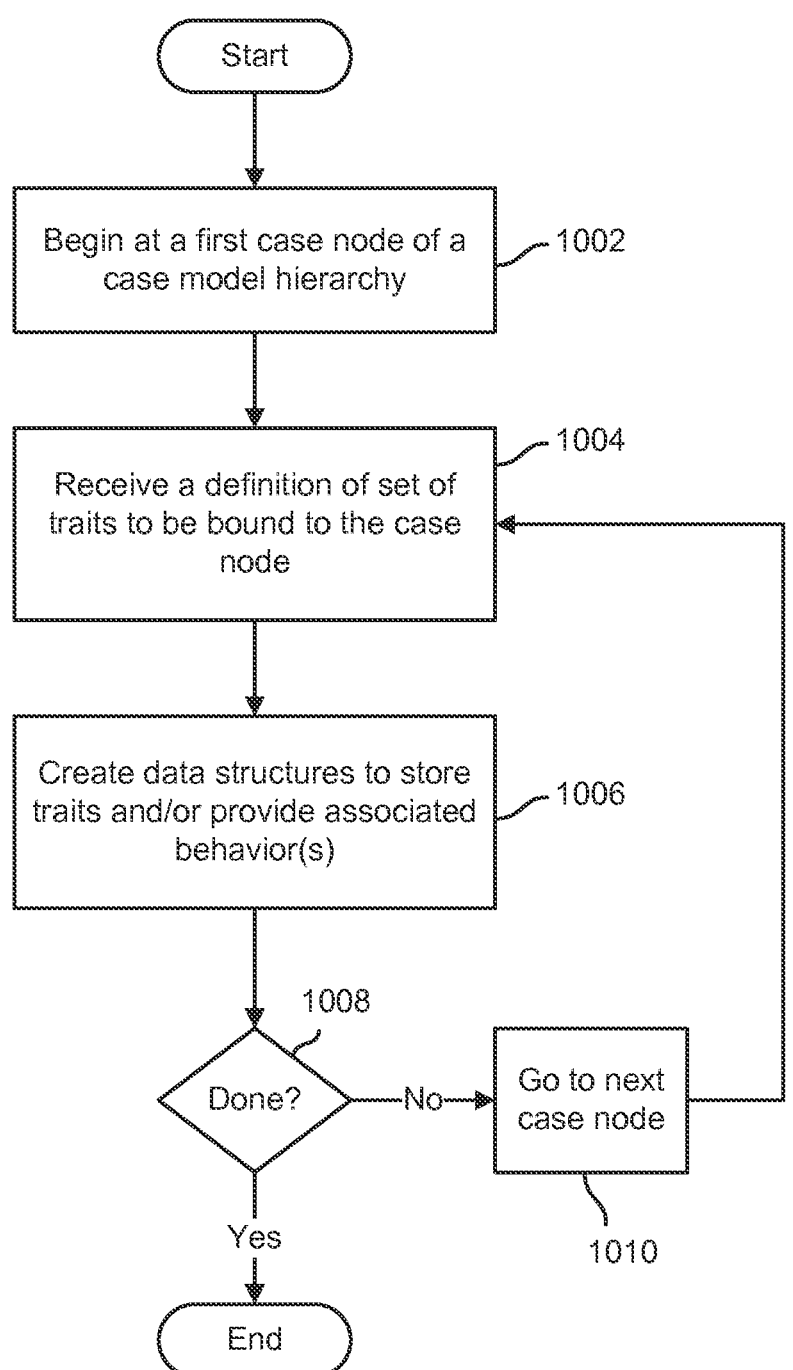
FIG. 10 is a flow chart illustrating an example embodiment of a process to bind traits to case nodes.

FIG. 10 is a flow chart illustrating an example embodiment of a process to bind traits to case nodes. In some embodiments, the process of FIG. 10 may be implemented by a case management system, such as case management system 206 of FIGS. 2 and 3, to bind traits to case nodes as defined in a case model definition. In some embodiments, the case model definition may comprise an XML or other structured data file. A hierarchical/nested container model portion of the case model definition may be parsed to determine and generate runtime data structures that represent the respective case node and their relationships to each other. In the example shown in FIG. 10, trait definition processing begins at a first case node in the hierarchy (1002), e.g., a root node. A definition of a set of traits to be associated with the case node being processed (initially in this example the root node) is received (1004). For example, a trait definition portion of the case model definition may be parsed to obtain the trait definition for the root node. Data structures to store traits (e.g., metadata values) and/or to be used to provide behaviors defined in the trait definition are created (1006) and associated with the case node to which they are to be bound per the case model definition. If there are further trait definitions to be process (1008), processing advances to a next case node (1010) and the trait definition for that case node is processed (1004, 1006). Processing continues until all trait definitions for all case nodes have been processed (1008).

Figure 11:
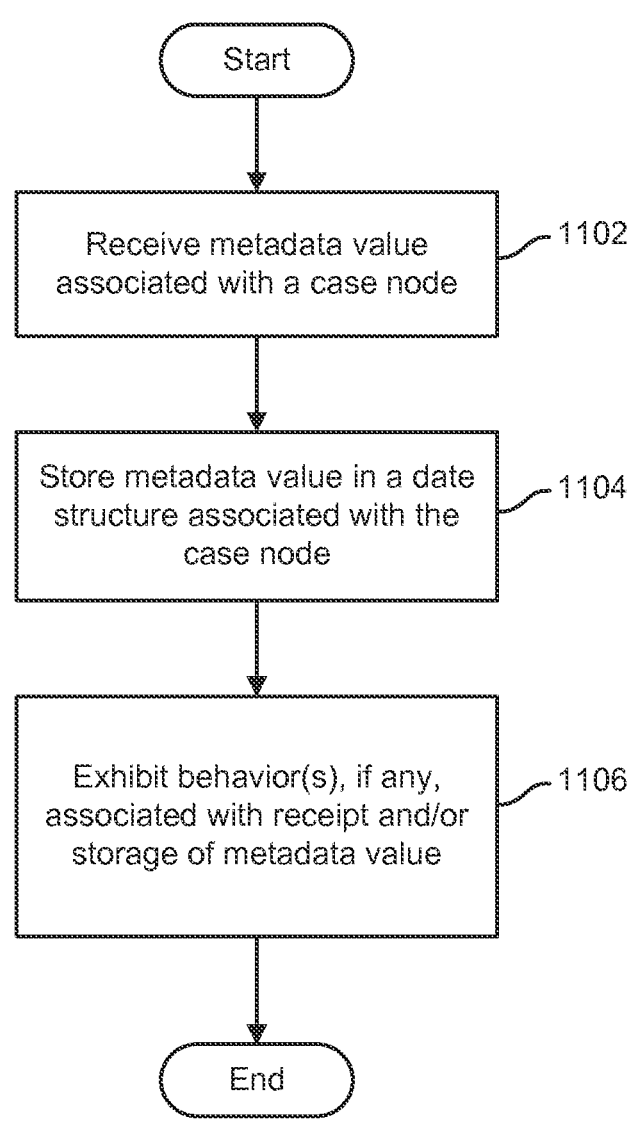
FIG. 11 is a flow chart illustrating an example embodiment of a process to store and process case node traits.

FIG. 11 is a flow chart illustrating an example embodiment of a process to store and process case node traits. In various embodiments, data structures created as described above in connection with FIG. 10 may be used to store data values as in the process of FIG. 11. In some embodiments, the process of FIG. 11 is implemented by a case management system, such as case management system 206 of FIGS. 2 and 3, to store case instance-specific metadata values for traits bound to case nodes as defined in a case model definition, and/or to exhibit associated behaviors as defined in the case model definition. In the example shown, a metadata value associated with a case node of a case instance is received (1102). For example, a user may provide user input, via a user interface, to provide a value for a metadata or other attribute defined in a trait definition for a case node. The metadata value is stored in a data structure associated with the case node of the case instance, in a location associated with a corresponding trait as defined in the case model definition (1104). Any behaviors associated with receipt and/or storing the metadata value is/are exhibited (1106), e.g., sending a notification, triggering a business process, transitioning a state machine of the case node to a destination phase/state, etc.

Figure 12:
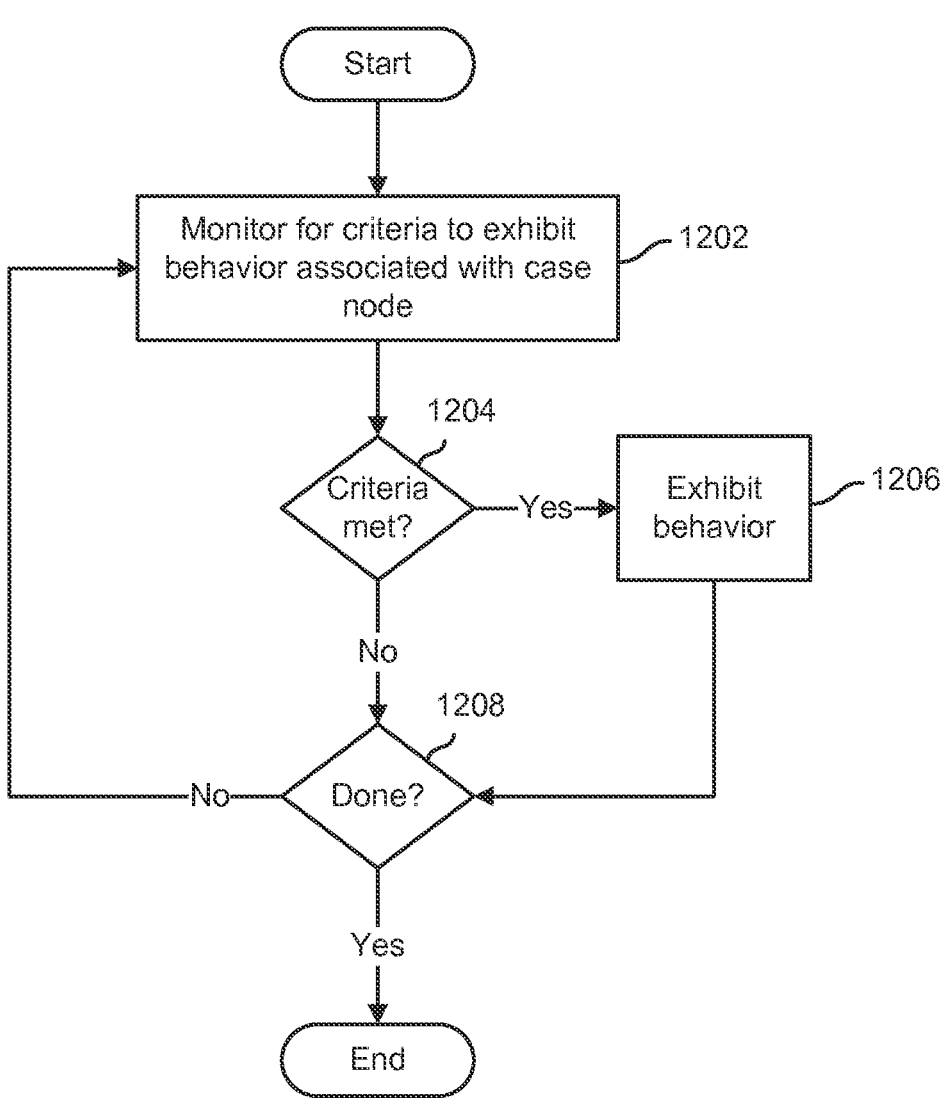
FIG. 12 is a flow chart illustrating an example embodiment of a process to exhibit behaviors associated with case nodes.

FIG. 12 is a flow chart illustrating an example embodiment of a process to exhibit behaviors associated with case nodes. In various embodiments, the process of FIG. 12 may be used to implement behaviors defined in a trait definition associated with a case node and/or instances thereof. In some embodiments, the process of FIG. 12 is implemented by a case management system, such as case management system 206 of FIGS. 2 and 3. In the example shown, criteria associated with exhibiting a behavior as defined in a trait definition associated with a case node are monitored (1202). For example, a listening entity may be configured to listen for an event, condition, and/or other criteria defined in the trait definition as triggering the behavior. If the criteria is/are determined to have been met (1204), the behavior as defined in the trait definition for the case node is exhibited (1206). If not (1204), monitoring continues (1208, 1202) until the process ends, e.g., the case instance is deactivated and associated values stored.

Figure 13:
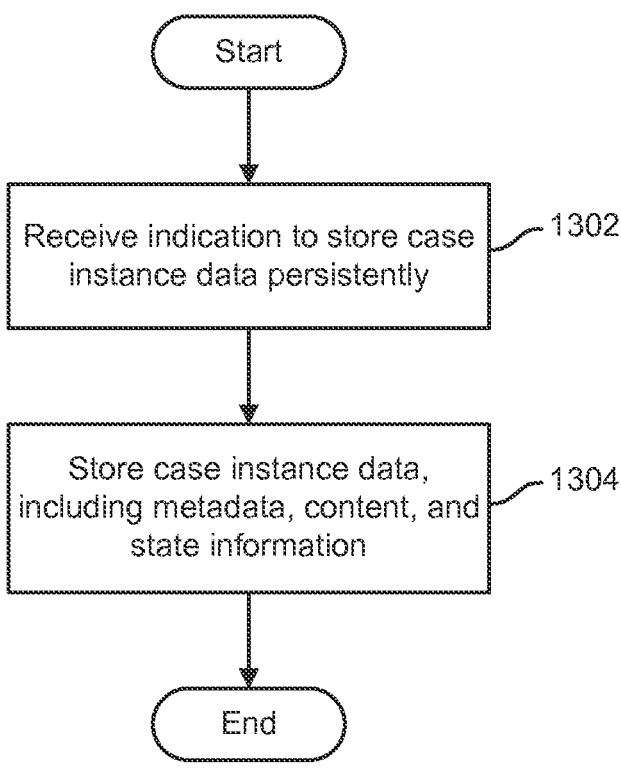
FIG. 13 is a flow chart illustrating an example embodiment of a process to store persistently data associated with traits bound to case nodes.

FIG. 13 is a flow chart illustrating an example embodiment of a process to store persistently data associated with traits bound to case nodes. In some embodiments, the process of FIG. 13 is implemented by a case management system, such as case management system 206 of FIGS. 2 and 3. In the example shown, an indication is received to store case instance data persistently (1302). For example, a case instance that has been created and had case instance variables populated with data values may be desired to be stored persistently. Alternatively, a case instance that has been accessed by using a case model and previously stored case instance data to instantiate the case instance may be desired to be stored persistently, for example once a user is done using the case instance actively. The case instance data is stored persistently, including metadata, content, and state information bound to the respective case nodes of the case instance (1304). In some embodiments, a database table and/or other data structure may be used to store case instance data persistently. If some embodiments, a schema or other structure of a database table or other data structure may be created and/or may have been created previously based at least in part on a case model definition of which the case instance is an instance. For example, the respective trait definitions of case nodes comprising the case model may be parsed and processed in some embodiments to generate and/or comprise a schema to be used to store corresponding case instance data persistently.

In another example, assume the following levels of hierarchy, which are all container nodes, have been defined:

Engagement Space→Project→Checklist→ChecklistItem

Further assume that within ChecklistItem there is a Case Leaf Node, e.g., "ChecklistItemContent" which represents the documents within that container. This hierarchy represents Engagement Collaboration kinds of solutions. Under various situations, and runtime modes, different sets of traits could be attached at each level, e.g., to meet the requirements of different "verticals". For example, in the case of a Supplier Exchange vertical solution, one could have at a) Engagement Space, a trait called "Capital Project" that captures a certain set of metadata applicable to Capital Projects. Likewise, at b) Project, one could have a trait called "Supplier Contract" which captures metadata related to Supplier Contracts, etc. With each set of traits associated behavior may be defined. In various embodiments, the same hierarchy could be used to serve a different vertical, such as the Commercial Loan Engagement Space. For the latter vertical, at a) Engagement Space, a trait called 'Customer Engagement Space" could be attached. That trait may capture, for example, "Customer data" such as customer name, address, and so on. Similarly, at b) Project, one could have a trait called "Loan" which could capture the information related to a commercial loan with regards to this customer. On these traits one could define events and model behavior if required.

Figure 14:
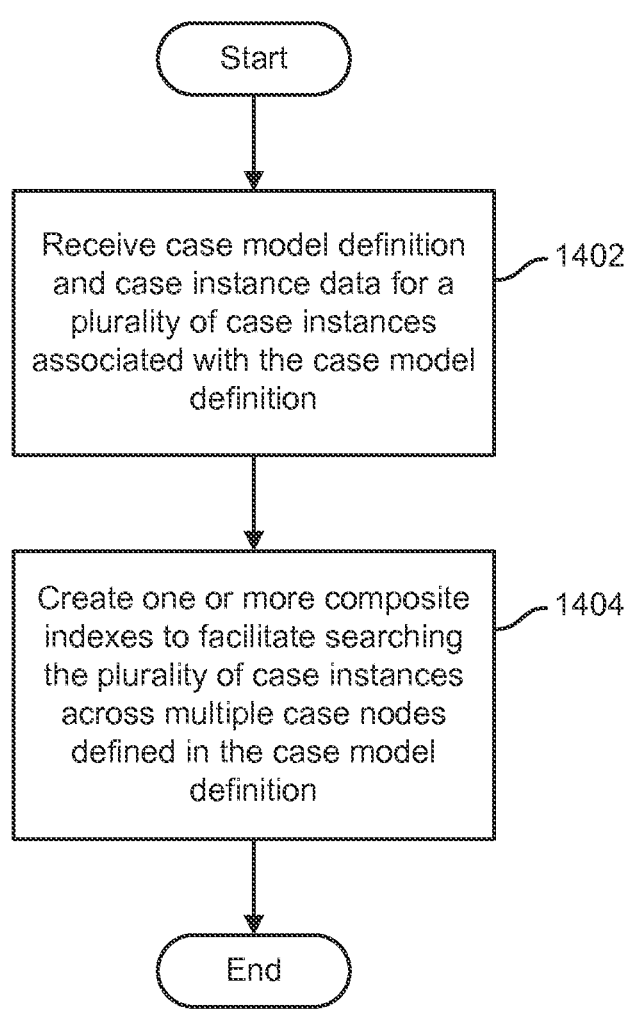
FIG. 14 is a flow chart illustrating an example embodiment of a process to create a composite index.

FIG. 14 is a flow chart illustrating an example embodiment of a process to create a composite index. In various embodiments, a case management system, such as case management system 206 of FIGS. 2 and 3, may implement the process of FIG. 14. In some embodiments, the process of FIG. 14 may be implemented by a component configured to be used to search a set of case management instances for those instances that satisfy search criteria that may reference values associated with multiple case nodes. In the example shown, a case model definition and case instance data for a plurality of case instances based on the case model definition are received (1402). For example, a case model definition may be received and may be used to create the plurality of case instances. The case model definition may be stored, for example, in a case model data store, such as case model data store 308 of FIG. 3. In some embodiments, the case instance data may be stored in a case instance data store, such as database 312 of FIG. 3. One or more composite indexes to be used to facilitate searching the plurality of case instances using search criteria (e.g., query terms) requiring consideration of case instance data affecting multiple case nodes (1404).

In some embodiments, case instance data may be stored in one or more database table, with each case instance having an associated row in the database table. In some embodiments, case instance data may be spread across multiple database tables, with each case node and/or subsets of case nodes having a corresponding table. In either approach, without a pre-computed composite index, a search involving values in multiple columns of a database, whether in one or more tables, can be time consuming and resource intensive. In various embodiments, a composite index facilitates more optimal queries by anticipating searches across multiple columns and generating an index across such columns.

FIG. 15 is a block diagram illustrating an example of a composite index in an embodiment of a case management system. In the example shown, a composite index across nodes of the case model shown in FIGS. 7 and 9 has been generated. Composite index 1500 in this example has been generated for use in responding to queries involving two case nodes, specifically the case nodes F11 (704) and F112 (710). Specifically, composite index 1500 indexes an associated set of case instance based on a first attribute "attribute_A" associated with case node F11 and a second attribute "attribute_B" associated with case node F112. For each pair of values for the respective attributes, in some embodiments composite index 1500 would include data indicating which case instances have that pair of values for "attribute_A" and "attribute_B" respectively. At query time, the composite index 1500 would be available for use to optimize a query involving query terms comprising values (or ranges of values, etc.) for the attributes "attribute_A" and "attribute_B" respectively.

Figures 16A, 16B:
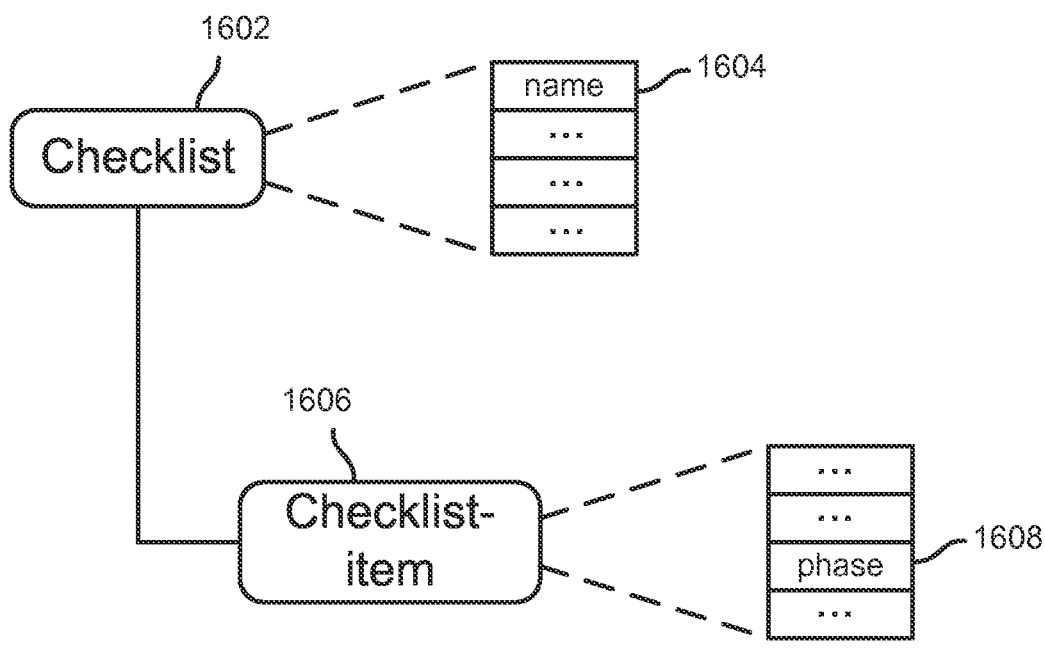
FIG. 16A is a block diagram illustrating an example of a portion of a case model hierarchy in an embodiment of a case management system.
FIG. 16B is a block diagram illustrating an example of a composite index in an embodiment of a case management system.

FIG. 16A is a block diagram illustrating an example of a portion of a case model hierarchy in an embodiment of a case management system. In the example shown, a portion of a case model is shown to include a first case node "Checklist" 1602 having a set of traits 1604 associated therewith and a second case node "Checklist-item" 1606 having a set of traits 1608 associated therewith. In the example shown, the set of traits 1604 associated with the "Checklist" case node 1602 includes a "name" attribute and the set of traits 1608 associated with the "Checklist-item" case node 1606 includes an attribute "phase". In some embodiments, the "phase" attribute may refer to a phase or state of a state machine associated with a case node, such as case node 1606 in this example.

FIG. 16B is a block diagram illustrating an example of a composite index in an embodiment of a case management system. In the example shown, a composite index 1620 has been provided to facilitate searches across the case nodes 1602 and 1606 of the case model shown in FIG. 16A. Specifically, composite index 1620 indexes the corresponding set of case instances across the "name" trait of case node 1602 and the "phase" trait of case node 1606. In various embodiments, the composite index 1620 may be deployed and used to optimize queries across the "name" attribute of case node 1602 and the "phase" attribute of case node 1606, such as a query to find case instances with the checklist name attribute having a value of "New Hire" and the checklist-item phase "Completed".

Figure 17:
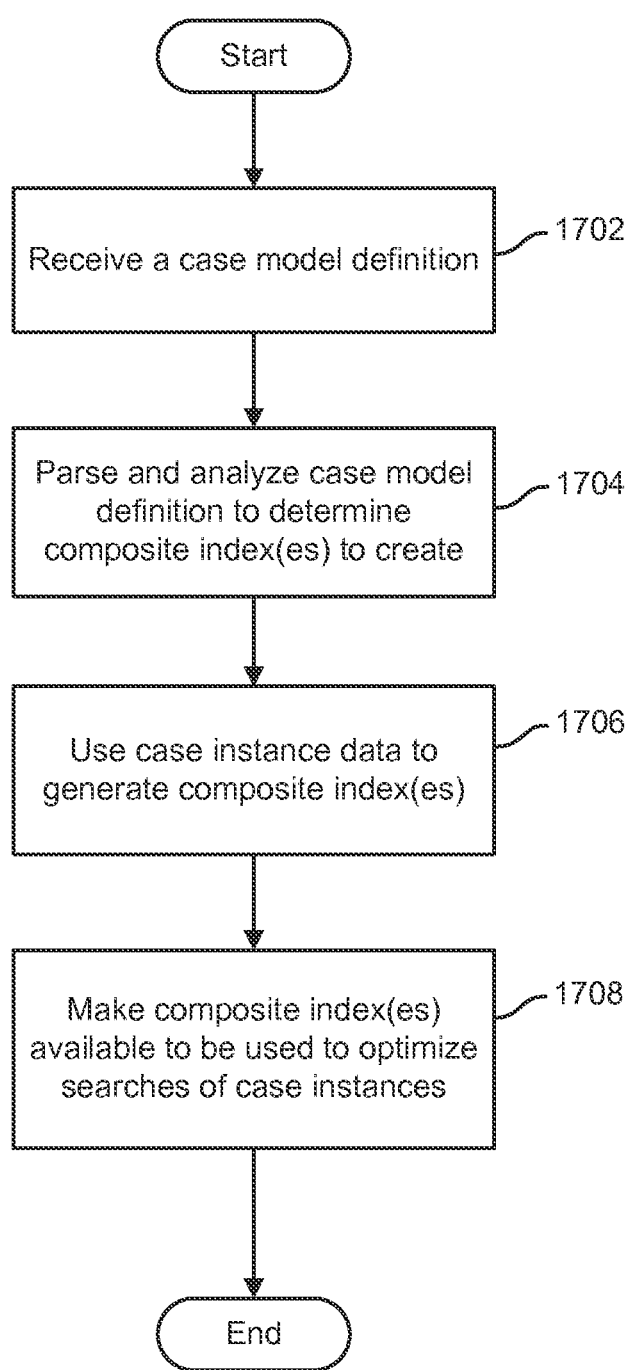
FIG. 17 is a flow chart illustrating an example embodiment of a process to create and deploy a composite index.

FIG. 17 is a flow chart illustrating an example embodiment of a process to create and deploy a composite index. In various embodiments, the process of FIG. 17 may be implemented by a case management system, such as case management system 206 of FIGS. 2 and 3. In the example shown, a case model definition is received (1702). The case model definition is parsed and analyzed programmatically to determine composite indexes to be created (1704). In some embodiments, a hint or other indication included in the case model by a developer of the case model may be used to determine composite indexes to be created. For example, a developer may include a composite index hint portion in the case model definition, in which attribute (trait) pairs (or sets of three or more) across which the developer considers it may be advantageous to create composite indexes may be indicated. In some embodiments, considerations such as the relationship between two (or more) case nodes within the case model hierarchy, the location of each respective attribute within a corresponding set of attributes (traits) with which the attribute is associated, and similarities or other relationships between attribute names may be considered programmatically in determining composite indexes to be created. In some embodiments, attribute pairings observed to have been encountered frequently in the past may be used to determine which composite indexes to create. For example, if queries to search for case instances having a certain "name" or "type" attribute in one case node and a certain "phase" or "state" value with respect to another case node have been observed, for the same case model and/or one have a similar structure, then a composite index across such values may be created. In some embodiments, the case management system may be configured to observe that a certain query across multiple case nodes has taken greater than a prescribed amount of time to complete, and a composite index may be generated, in response to such an observation, to improve performance with respect to future queries across the same case nodes and/or attributes. Referring further to FIG. 17, case instance data is used to generate composite indexes that are determined to be created (1706), and the resulting composite indexes are made available to be used to optimize searches of the case instances.

Figure 18:
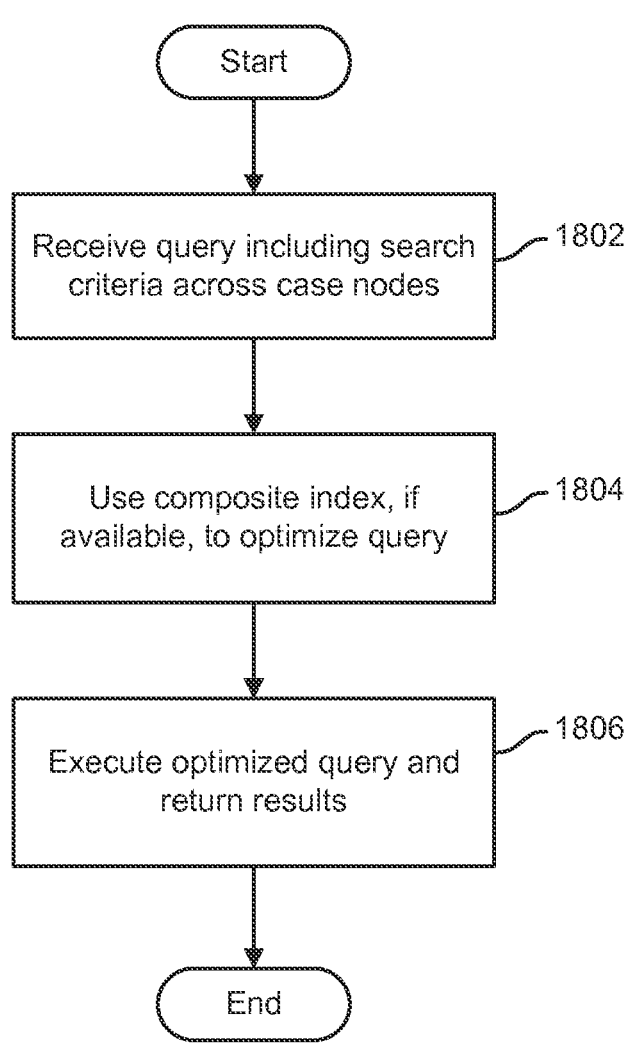
FIG. 18 is a flow chart illustrating an example embodiment of a process to use a composite index to perform a search for case instances.

FIG. 18 is a flow chart illustrating an example embodiment of a process to use a composite index to perform a search for case instances. In various embodiments, a search engine, query optimizer, and/or other component comprising or otherwise associated with a case management system, such as case management system 206 of FIGS. 2 and 3, may be used to implement the process of FIG. 18. In the example shown, a query that includes search criteria across multiple case nodes is received (1802). A composite index (see, e.g., FIG. 15 and FIG. 16B), if available, is used to optimize the query (1804). The optimized query is executed and responsive case instances are identified and returned as results of the query (1806).

Generating and deploying composite indexes as disclosed herein in various embodiments may improve the speed and reduce the resource consumption associated with search for case instances that satisfy search criteria across multiple case nodes.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A computer-implemented method of facilitating searching case instances, comprising:

receiving, by a processor, an indication to create a composite index across hierarchical case nodes comprising a case model;

analyzing programmatically a case model definition associated with the case model to determine two or more attributes associated with two or more case nodes with respect to which a criteria to generate the composite index is satisfied, the two or more case nodes comprising case nodes from at least two different levels of the hierarchy of case nodes;

generating, by the processor, the composite index using case instance data for a plurality of case instances associated with the case model, generating the composite index comprising accessing a database storing the case instance data and storing attribute values from a plurality of database schema elements to the composite index, each of the two or more case nodes having an associated schema element from the plurality of database schema elements, wherein the composite index comprises:

a combination of attribute values for the two or more attributes; and an indication of which of the plurality of case instances has the combination of attribute values; and deploying the composite index in an electronic case management system to facilitate searching the plurality of case instances using search criteria across multiple case nodes.

2. The computer-implemented method of claim 1, wherein the case model defines case roles, case phases, and permissions.

3. The computer-implemented method of claim 1, wherein the criteria is based on an analysis for attribute pairings that have been observed in past queries in a frequency exceeding a threshold frequency value.

4. The computer-implemented method of claim 1, wherein the criteria is based on an analysis for attribute pairings that have been observed in past queries in a frequency exceeding a threshold frequency value, for the case model or for another case model having another structure determined to be similar to a structure of the case model.

5. The method of claim 1, wherein each of the plurality of database schema elements is a table.

6. A computer program product to facilitate searching case instances, the computer program product being embodied in a non-transitory computer readable storage medium and comprising computer instructions for:

receiving, by an electronic case management system, an indication to create a composite index across hierarchical case nodes comprising a case model;

analyzing programmatically a case model definition associated with the case model to determine two or more attributes associated with two or more case nodes with respect to which a criteria to generate the composite index is satisfied, the two or more case nodes comprising case nodes from at least two different levels of the hierarchy of case nodes; and generating, by the electronic case management system, a composite index using case instance data for a plurality of case instances associated with the case model, wherein generating the composite index comprises accessing a database storing the case instance data and storing attribute values from a plurality of database schema elements to the composite index, each of the two or more case nodes having an associated schema element from the plurality of database schema elements, wherein the composite index comprises:

a combination of attribute values for the two or more attributes; and an indication of which of the plurality of case instances has the combination of attribute values; and deploying the composite index in the electronic case management system to facilitate searching the plurality of case instances using search criteria across multiple case nodes.

7. The computer program product of claim 6, wherein the case model defines case roles, case phases, and permissions.

8. The computer program product of claim 6, wherein the criteria is based on an analysis for attribute pairings that have been observed in past queries in a frequency exceeding a threshold frequency value.

9. The computer program product of claim 6, wherein the criteria is based on an analysis for attribute pairings that have been observed in past queries in a frequency exceeding a threshold frequency value, for the case model or for another case model having another structure determined to be similar to a structure of the case model.

10. The computer program product of claim 6, wherein the criteria is based on an analysis for providing the composite index such that the composite index facilitates optimal queries by anticipating searches across a plurality of columns.

11. The computer program product of claim 10, wherein the criteria is based on the analysis for providing the composite index that facilitates optimal queries by anticipating searches across the plurality of columns and for generating the composite index across the plurality of columns.

12. The computer program product of claim 6, wherein the computer instructions are further for receiving a query that includes query terms associated with multiple case nodes and using the composite index to optimize execution of the query.

13. The computer program product of claim 6, wherein each of the plurality of database schema elements is a table.

14. An electronic case management system, comprising:
a storage device configured to store a case model;
a database storing database storing case instance data for a plurality of case instances associated with the case model, the case instance data stored across a plurality of database schema elements, and
a processor coupled to the storage device and configured to:

receive an indication to create a composite index across hierarchical case nodes comprising the case model;

analyze programmatically a case model definition associated with the case model to determine two or more attributes associated with two or more case nodes with respect to which a criteria to generate the composite index is satisfied, the two or more case nodes comprising case nodes from at least two different levels of the hierarchy of case nodes; and using the case instance data to generate the composite index, wherein generating the composite index comprises storing attribute values from the plurality of database schema elements to the composite index, each of the two or more case nodes having an associated schema element from the plurality of database schema elements, wherein the composite index comprises:

a combination of attribute values for the two or more attributes; and an indication of which of the plurality of case instances has the combination of attribute values; and deploying the composite index to facilitate searching the plurality of case instances using search criteria across multiple case nodes.

15. The system of claim 14, wherein the case model defines case roles, case phases, and permissions.

16. The system of claim 14, wherein the criteria is based on an analysis for attribute pairings that have been observed in past queries in a frequency exceeding a threshold frequency value.

17. The system of claim 14, wherein the criteria is based on an analysis for attribute pairings that have been observed in past queries in a frequency exceeding a threshold frequency value, for the case model or for another case model having another structure determined to be similar to a structure of the case model.

18. The system of claim 14, wherein the criteria is based on an analysis for providing the composite index such that the composite index facilitates optimal queries by anticipating searches across a plurality of columns.

19. The system of claim 18, wherein the criteria is based on the analysis for providing the composite index that facilitates optimal queries by anticipating searches across the plurality of columns and for generating the composite index across the plurality of columns.

20. The system of claim 14, wherein the processor is further configured to receive a query that includes query terms associated with multiple case nodes and to use the composite index to optimize execution of the query.

21. The electronic case management system of claim 14, wherein each of the plurality of database schema elements is a table.

* * * * *